United States Patent
Powell

(10) Patent No.: US 9,907,433 B2
(45) Date of Patent: Mar. 6, 2018

(54) UNIVERSAL WATER FILTER ASSEMBLY FOR MULTIPLE COFFEE MAKERS

(71) Applicant: General Electric Company, Schenectady, NY (US)

(72) Inventor: Wade Antoine Powell, La Grange, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 144 days.

(21) Appl. No.: 14/926,149

(22) Filed: Oct. 29, 2015

(65) Prior Publication Data

US 2017/0119204 A1 May 4, 2017

(51) Int. Cl.
*A47J 31/60* (2006.01)
*C02F 1/00* (2006.01)
*B01D 35/30* (2006.01)
*B01D 29/15* (2006.01)

(52) U.S. Cl.
CPC ............ *A47J 31/605* (2013.01); *B01D 29/15* (2013.01); *B01D 35/306* (2013.01); *C02F 1/003* (2013.01); *B01D 2201/291* (2013.01); *C02F 2201/004* (2013.01); *C02F 2201/006* (2013.01); *C02F 2307/10* (2013.01); *C02F 2307/12* (2013.01)

(58) Field of Classification Search
None
See application file for complete search history.

(56) References Cited

U.S. PATENT DOCUMENTS

| | | | | |
|---|---|---|---|---|
| 5,567,308 | A * | 10/1996 | Visser | B01D 29/114 210/232 |
| 9,023,205 | B2 * | 5/2015 | Namur | A47J 31/605 210/282 |
| 2007/0289918 | A1 | 12/2007 | Staiger et al. | |
| 2011/0232500 | A1 * | 9/2011 | Turchi | A47J 31/605 99/295 |
| 2014/0209531 | A1 * | 7/2014 | Sann | B01D 35/147 210/435 |
| 2014/0217001 | A1 * | 8/2014 | Vercammen | B01D 27/08 210/232 |
| 2016/0207790 | A1 * | 7/2016 | Mitchell | C02F 1/003 |

* cited by examiner

*Primary Examiner* — Benjamin M Kurtz
(74) *Attorney, Agent, or Firm* — Dority & Manning, P.A.

(57) ABSTRACT

A water filter assembly for a beverage dispenser. The water filter assembly may generally include filter media positioned within a filter housing which may be attachable to a first fitting or a second fitting of a water storage reservoir to provide filtered water to a reservoir outlet. The filter housing includes an adapter sleeve that defines mounting features that correspond with the first fitting and the second fitting to enable the water filter assembly to connect to either of the first fitting or the second fitting. In this manner, a single water filter assembly may be used in beverage dispensers having different reservoir fittings.

20 Claims, 13 Drawing Sheets

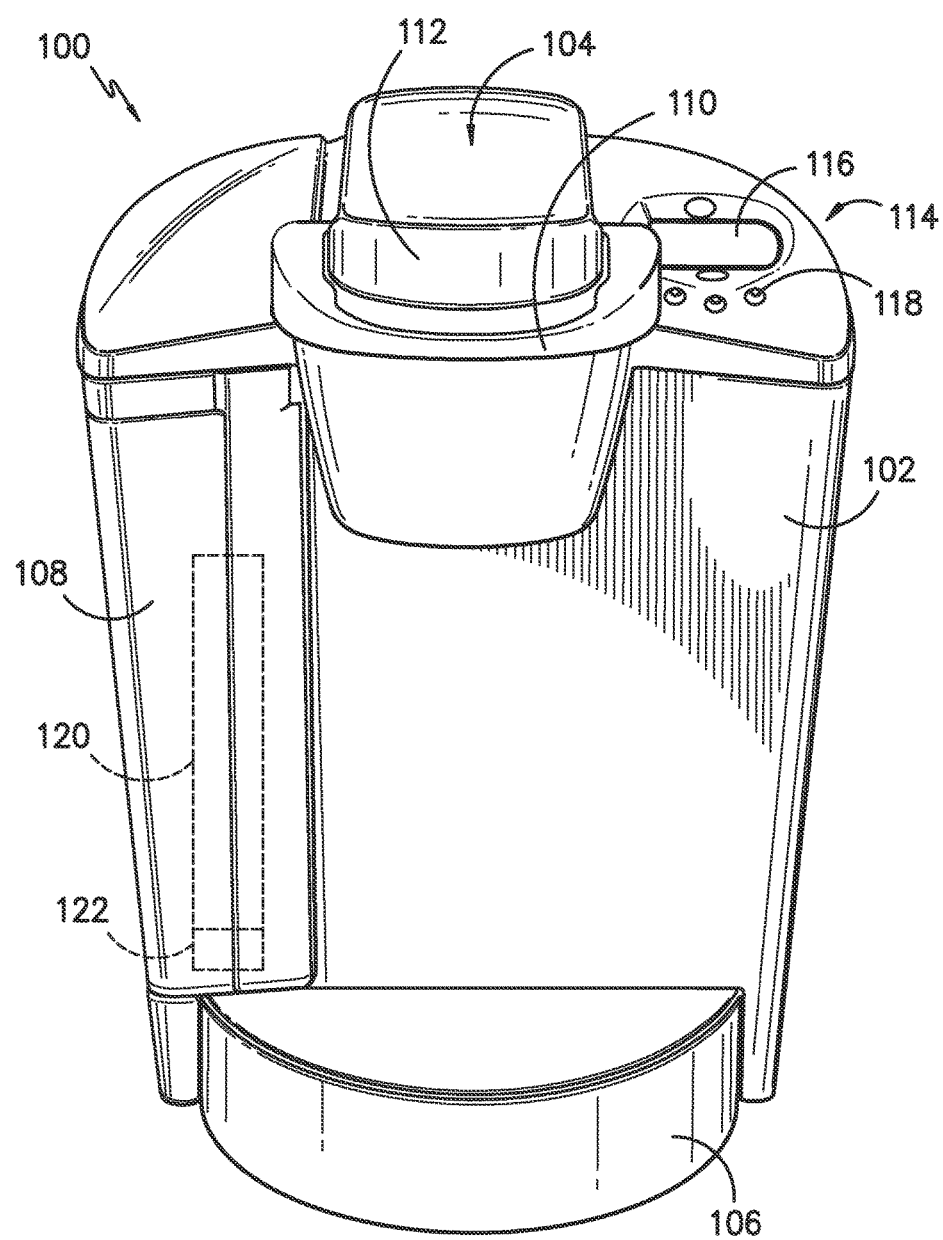
FIG. -1-

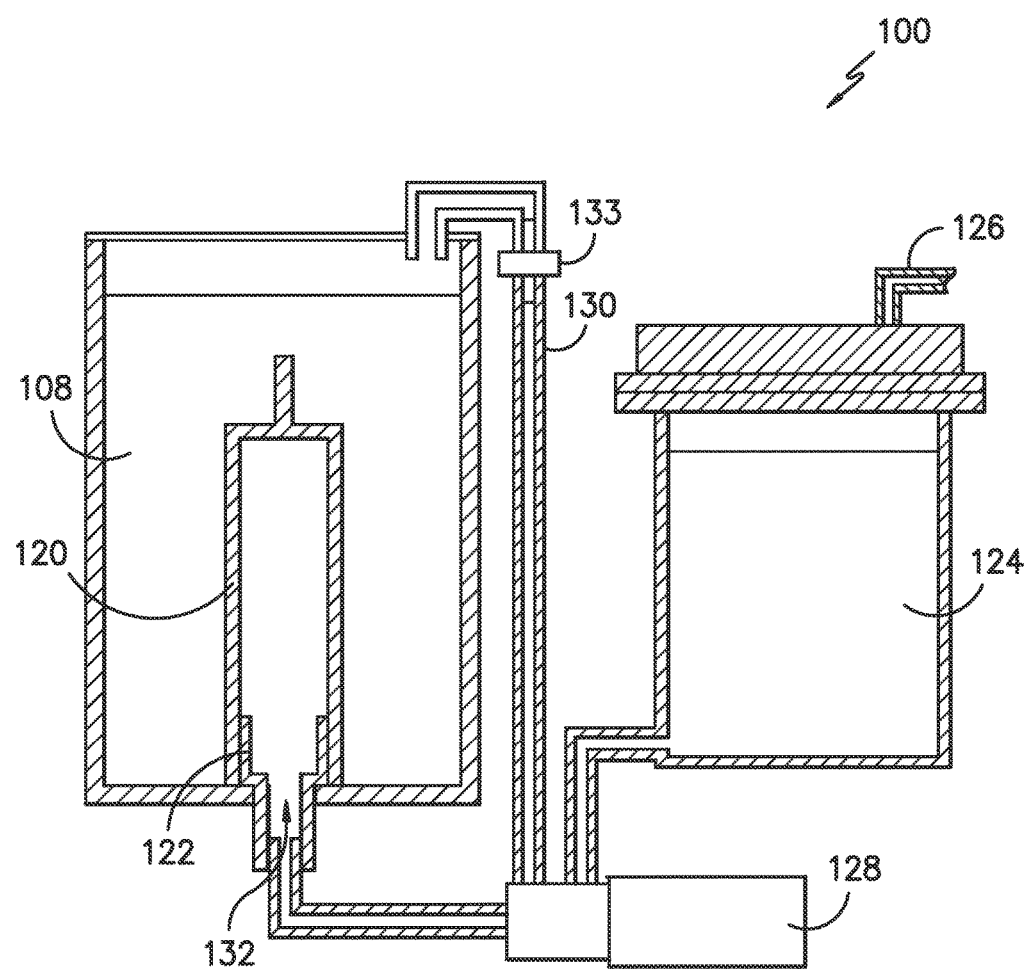
FIG. -2-

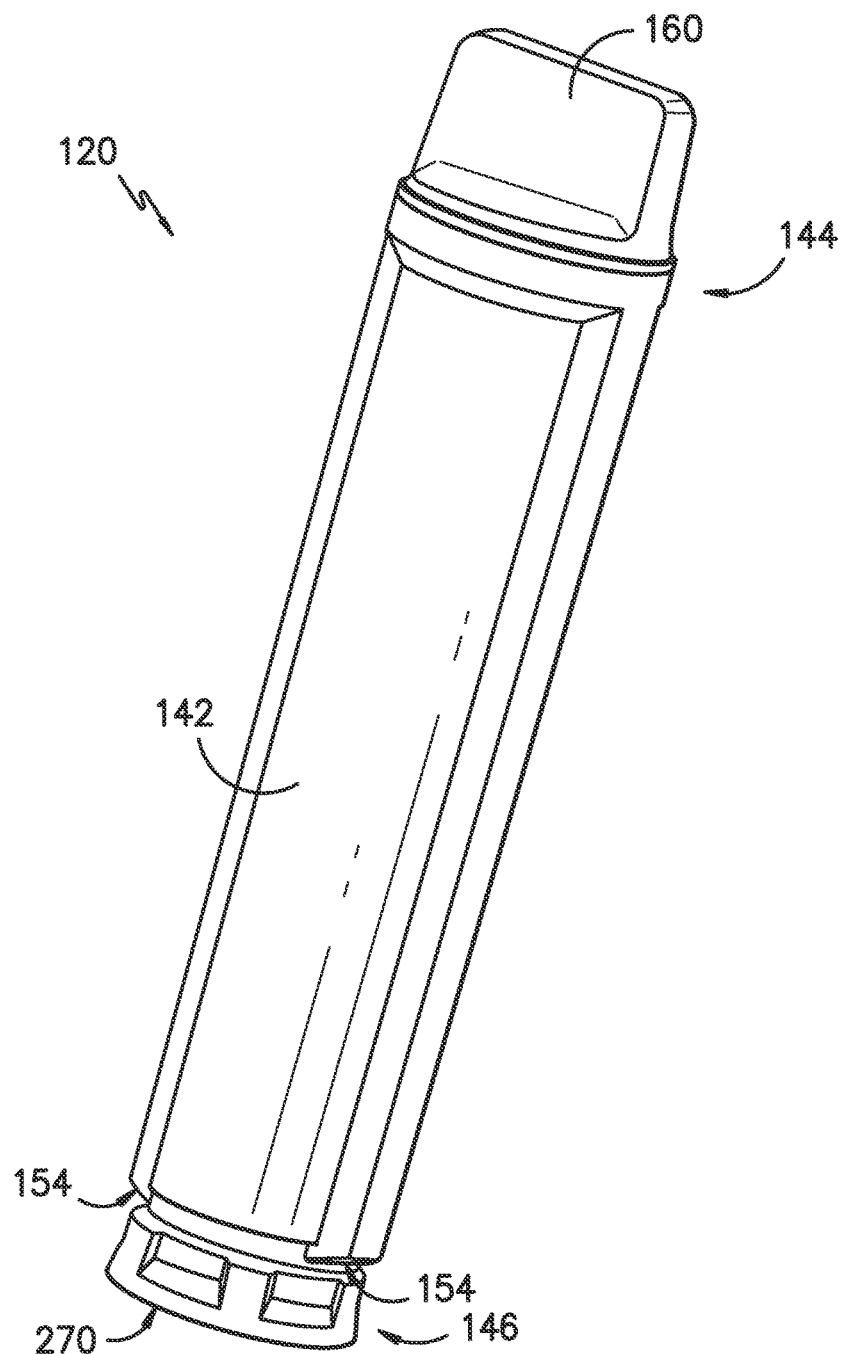
FIG. -3-

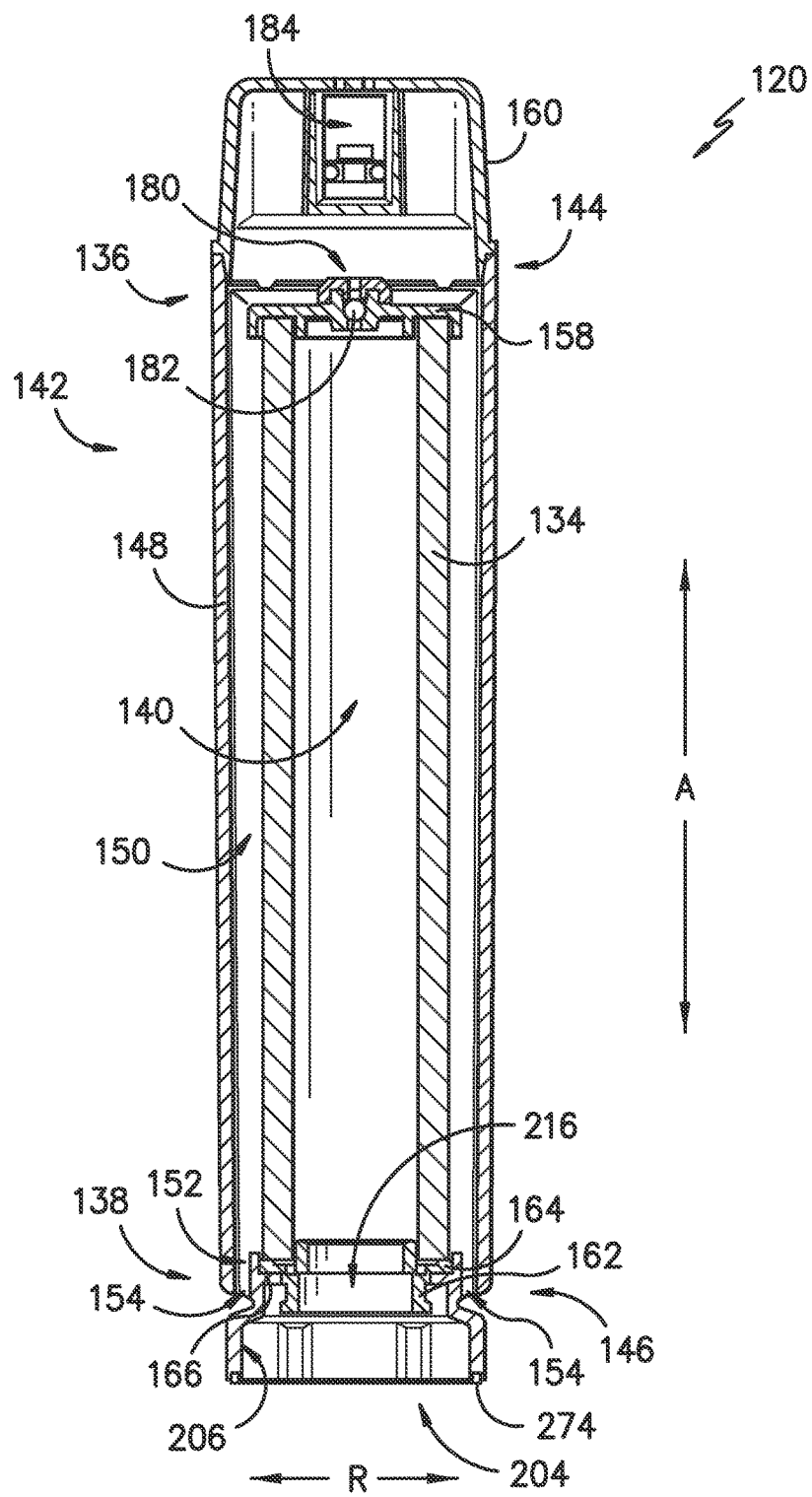
FIG. -4-

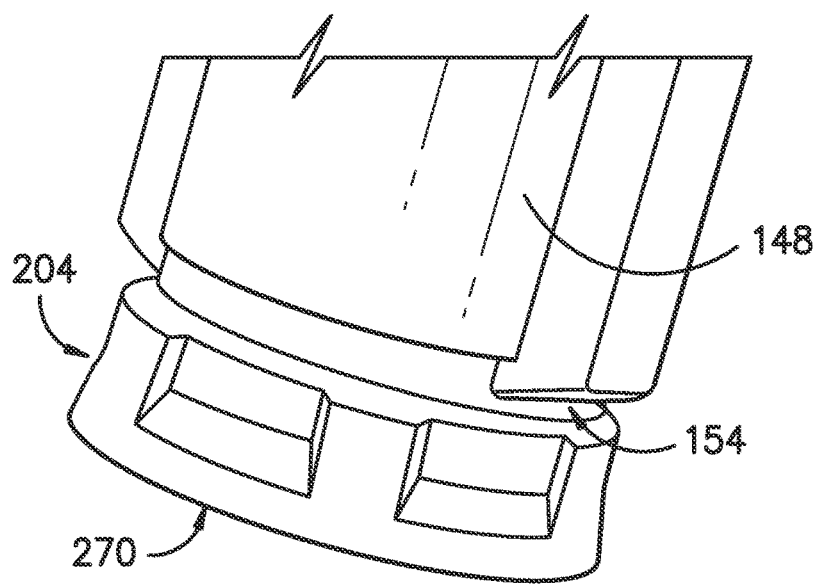
FIG. -5-
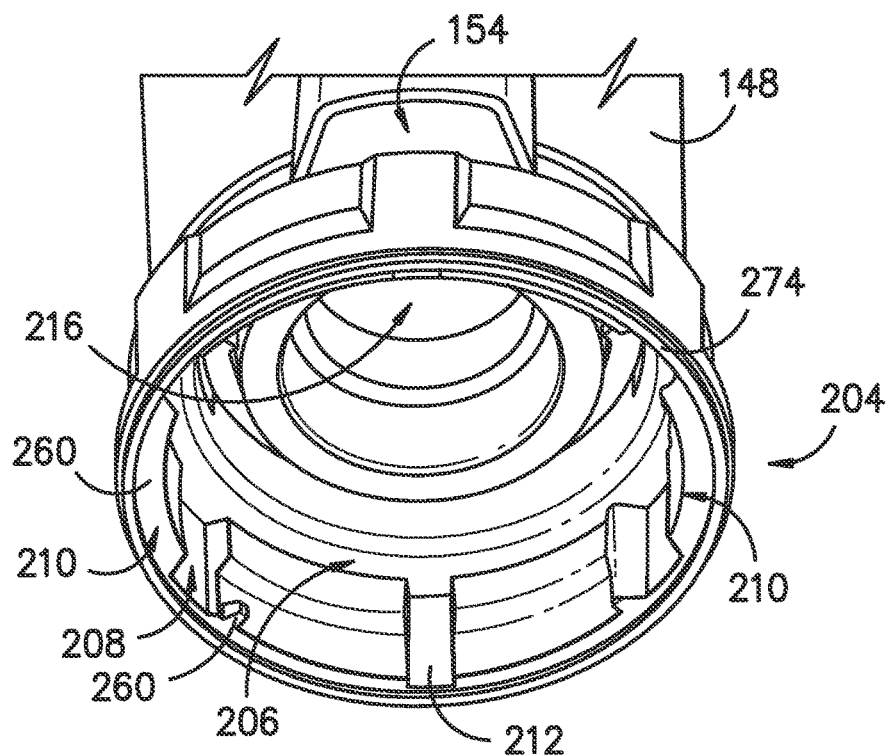
FIG. -6-

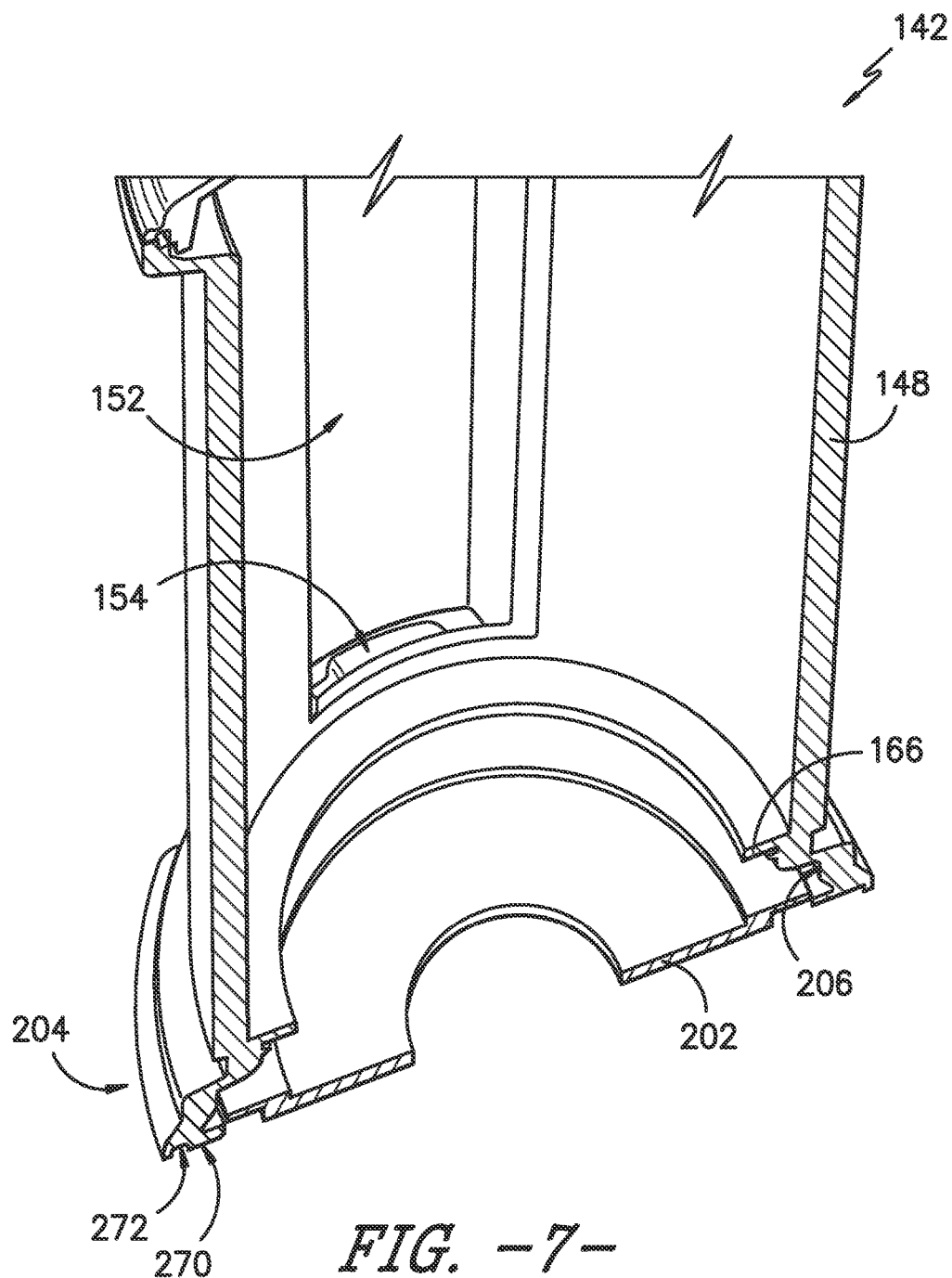
FIG. -7-

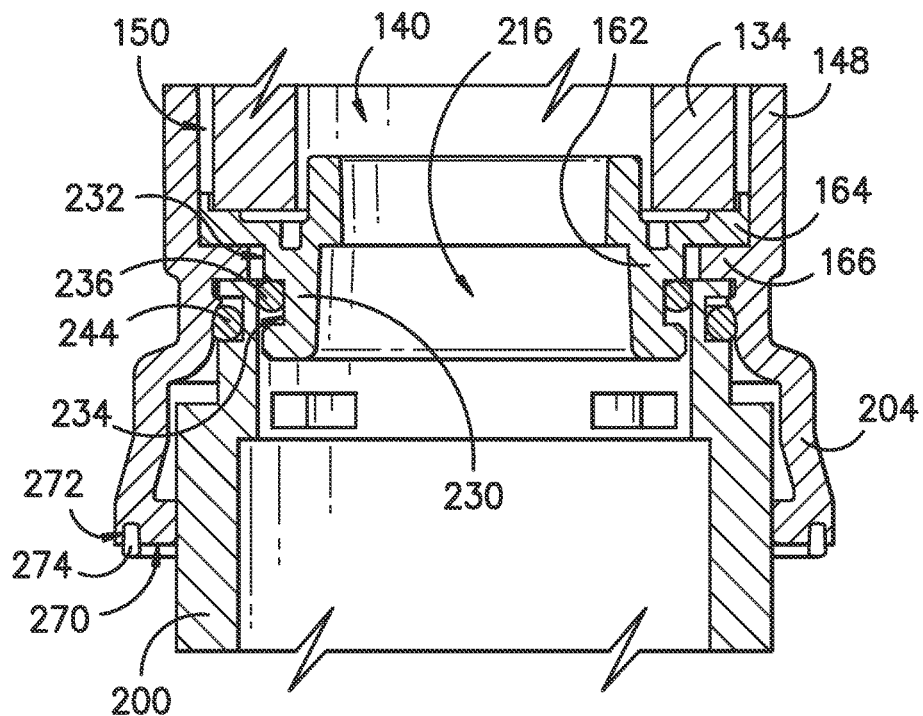
FIG. -8-
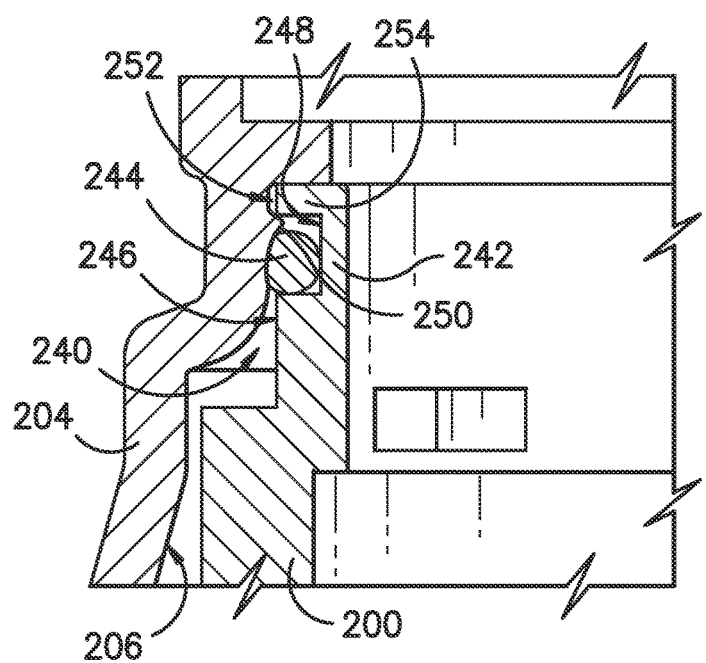
FIG. -9-

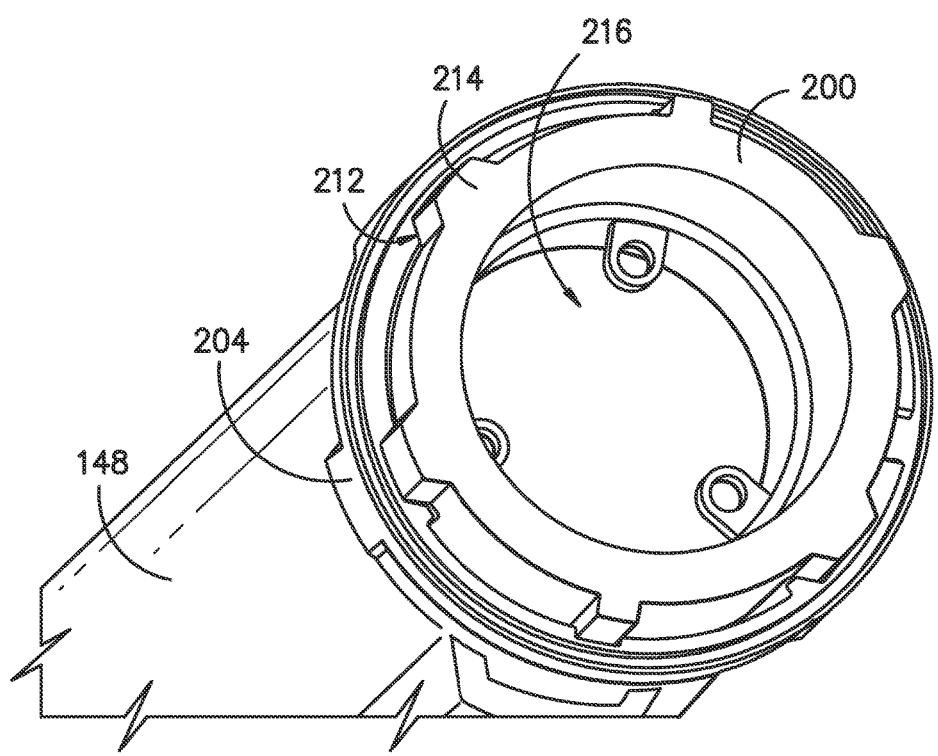
FIG. -10-

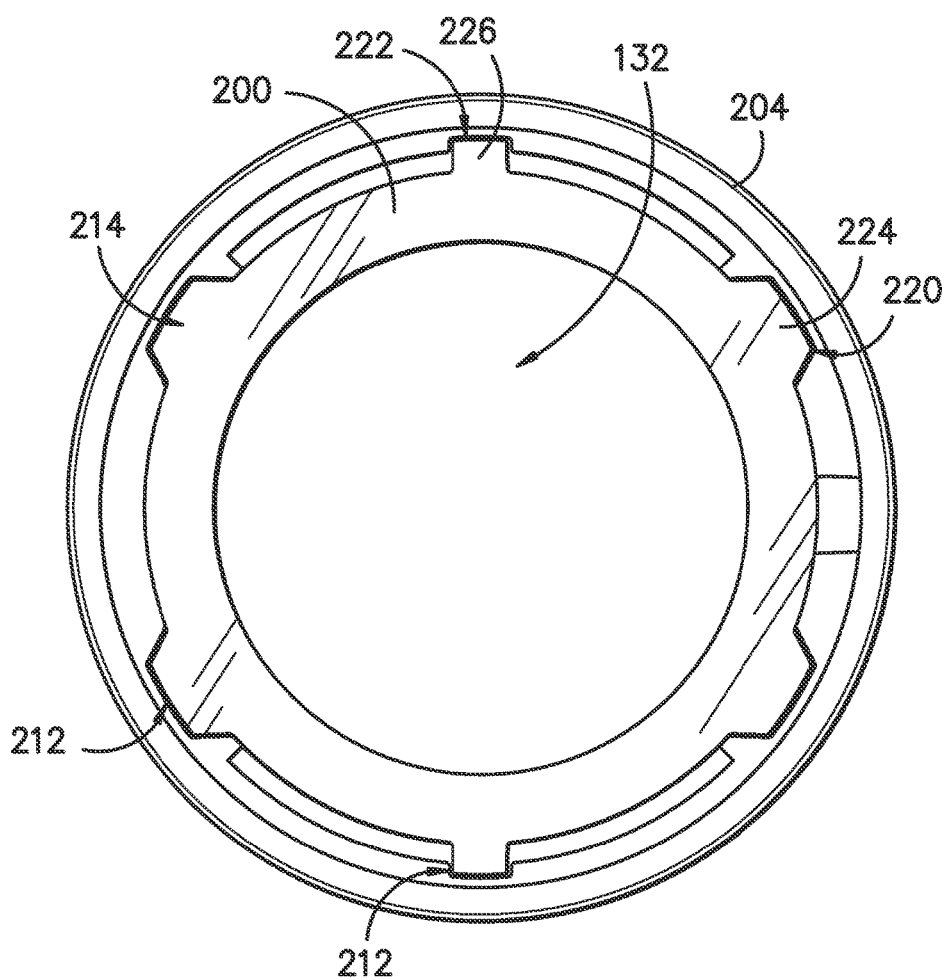
FIG. -11-

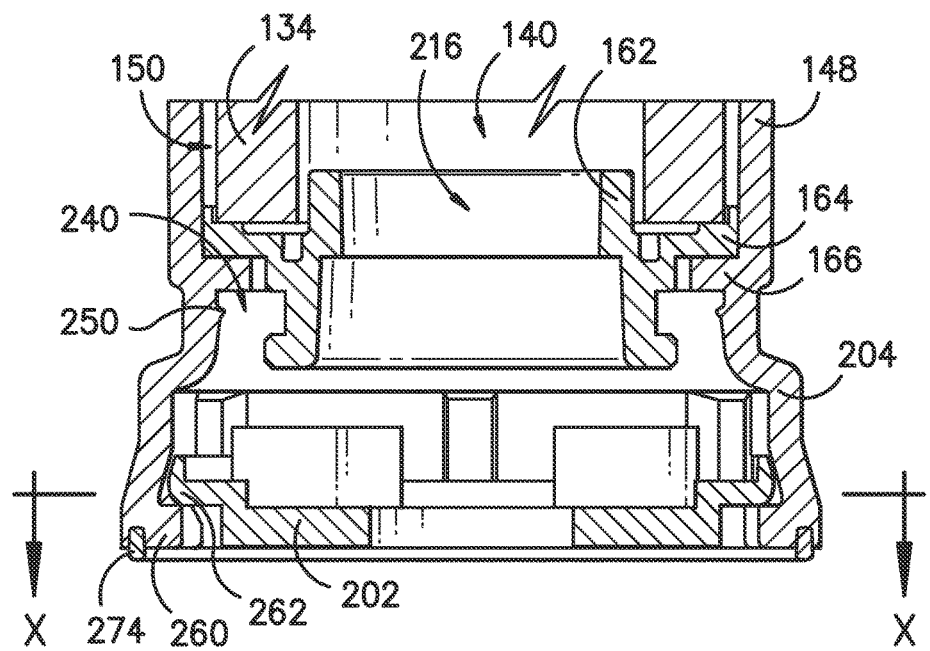
FIG. -12-
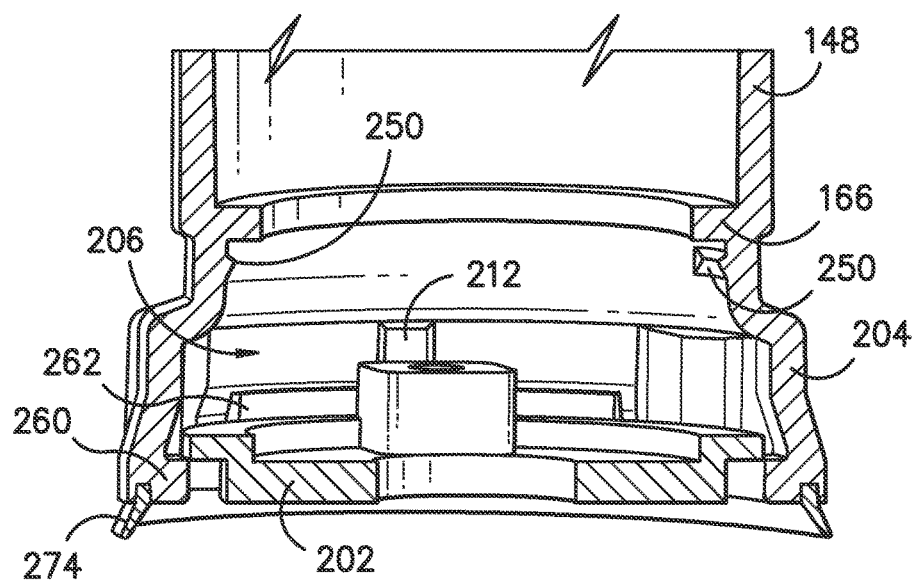
FIG. -13-

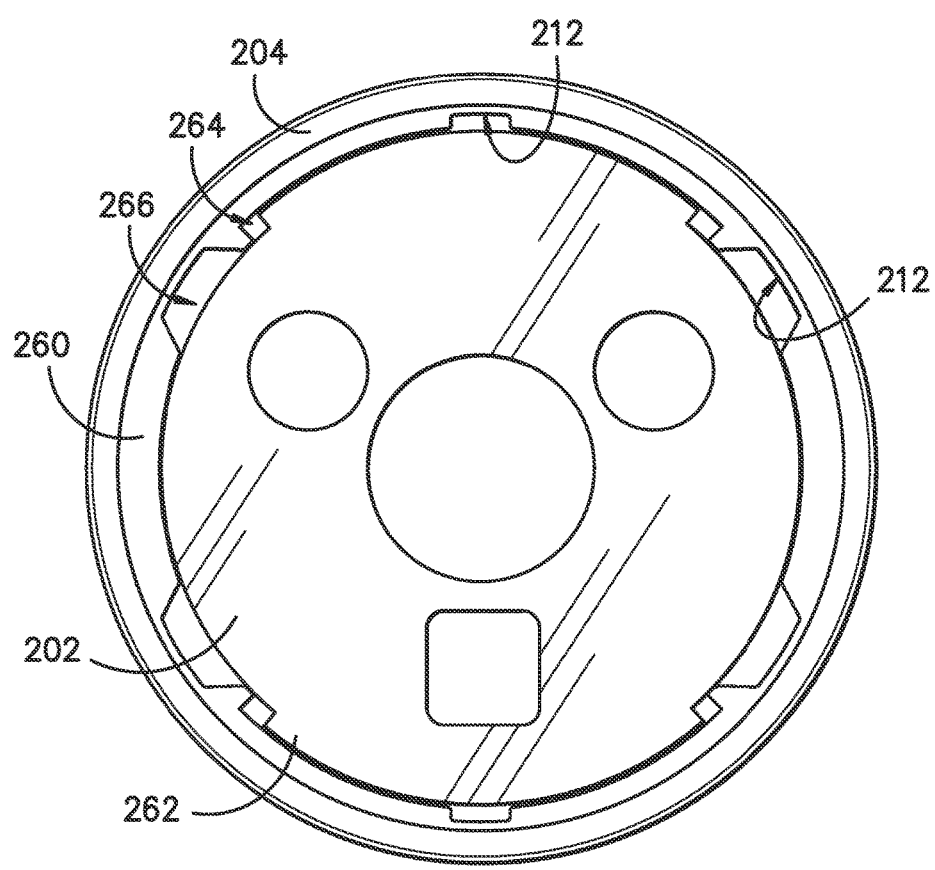
FIG. -14-

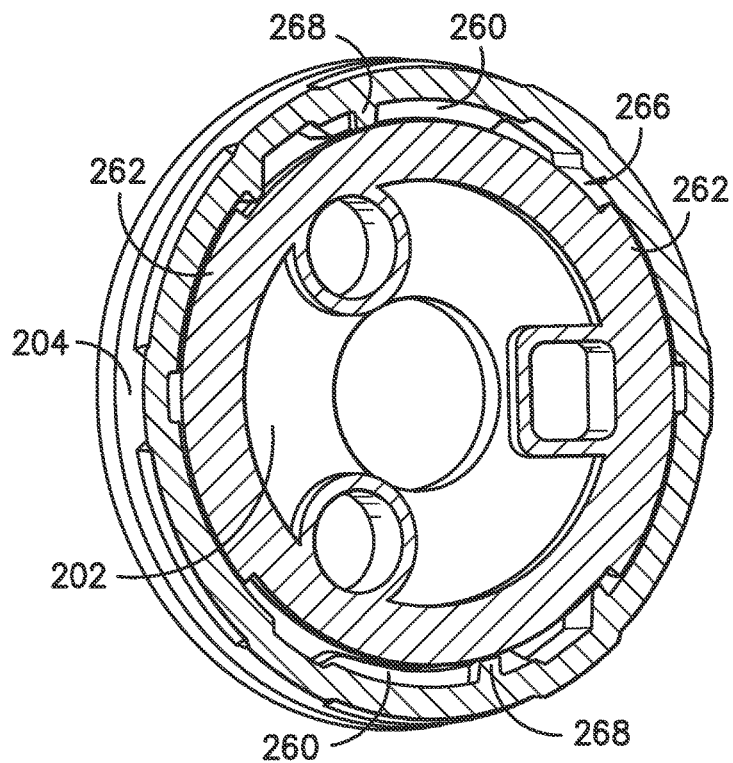
FIG. -15-
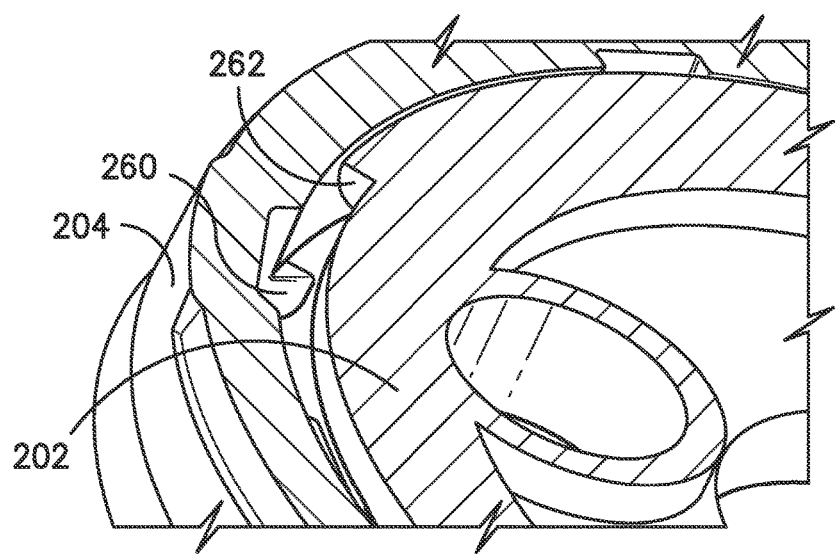
FIG. -16-

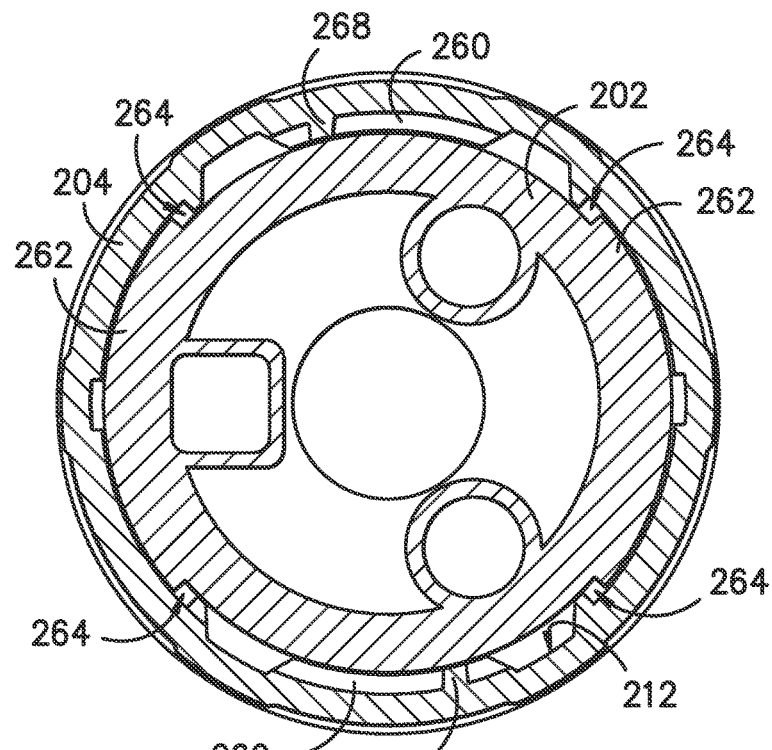
FIG. -17A-
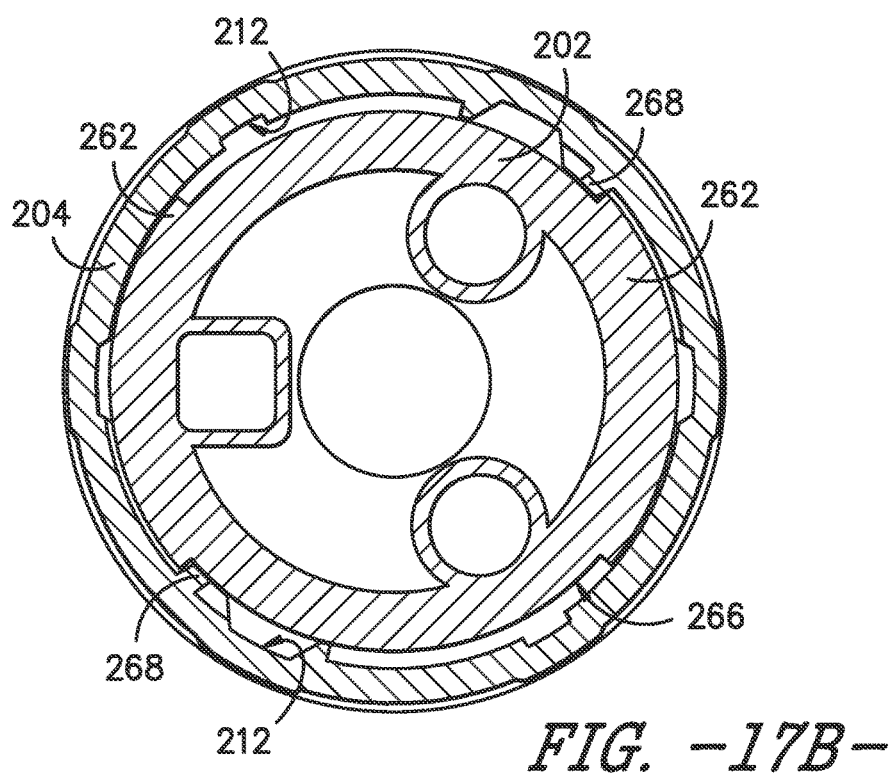
FIG. -17B-

UNIVERSAL WATER FILTER ASSEMBLY FOR MULTIPLE COFFEE MAKERS

FIELD OF THE INVENTION

The subject matter of the present disclosure relates generally to a water filter assembly, or more specifically, to a universal water filter assembly capable of use with multiple coffee makers.

BACKGROUND OF THE INVENTION

Water filter assemblies are commonly used with a variety of consumer and commercial appliances to remove dirt, sediment, and other contaminants from unfiltered water sources such as, for example, municipal water supplies. These water filter systems typically receive unfiltered water through a filter inlet, filter the unfiltered water by passing it through filter media to remove contaminants and debris, and pass the filtered water out through a filter outlet to the appliance for end use.

For example, single serve beverage dispensers (SSBDs), including coffee maker appliances, utilize water for brewing and mixing operations. In order to provide single-serve beverages, SSBDs generally dispense small volumes of liquid (e.g., between eight and sixteen ounces) for each beverage. To permit consecutive preparation of beverages and decrease preparation time, certain SSBDs commonly include a removable water storage reservoir holding enough water to dispense between four and eight single-serve beverages. It is generally desirable to ensure that water stored in the reservoir is free from contaminants and other debris.

Certain water filter assemblies include a filter cartridge that is placed over a fluid outlet within the reservoir to filter contaminants from the water within the reservoir. The filter cartridge may include filter media, such as an activated carbon block, a pleated polymer sheet, a spun cord material, or a melt blown material. The filter media is positioned within the filter cartridge and filters water passing therethrough. For example, a block of activated carbon has pores that permit a flow of water through the block. By passing through the pores, contaminants such as sand, rust, and cysts within the flow of water can be mechanically filtered out of the water. Similarly, volatile organic compounds such as chloroform, lindane, and atrazine can be adsorbed into pore surfaces as water moves through the carbon block.

Over time, the filter media will lose effectiveness. For example, pores of the filter media can become clogged or the filter media can become saturated with contaminants. To ensure that the filter media has not exceeded its filtering capacity and proper operation of the SSBD is maintained, the filter media is preferably replaced or serviced at regular intervals regardless of its current performance. To permit replacement or servicing of the filter media, the filter cartridge is generally removably mounted to a fitting within the reservoir. The filter cartridge may be removed from the fitting and the reservoir and replaced by a replacement filter cartridge (which may be a separate filter cartridge or the same filter cartridge after cleaning or otherwise servicing).

It is important that the proper water filter cartridge be used with a given appliance. For example, if the wrong filter cartridge is used, leakage, insufficient filtration, or system blockage may occur. Similarly, if a filter cartridge is improperly installed, leakage or malfunctioning can occur. To prevent installation of an incompatible filter cartridge, water filtration systems typically have a reservoir fitting that only accepts compatible filter cartridges. More specifically, the reservoir fitting may have mounting features, e.g., keyed surfaces, which prevent installation of incompatible filter cartridges. However, such features may unnecessarily restrict the types of filters that may be used with a given appliance. For example, Keurig® 1.0 and Keurig® 2.0 coffee makers have keyed surfaces which require different filter cartridges to be used for each, but the filter media and cartridge performance and operation is otherwise the same.

Accordingly, a universal water filter assembly that can be used with multiple coffee makers having different keyed features would be useful. More particularly, a universal water filter assembly that may be used in both Keurig® 1.0 and 2.0 coffee makers with easier installation and reduced likelihood of leaks would be especially beneficial.

BRIEF DESCRIPTION OF THE INVENTION

Additional aspects and advantages of the invention will be set forth in part in the following description, may be apparent from the description, or may be learned through practice of the invention.

In general, the present invention provides a water filter assembly for a beverage dispenser. The water filter assembly may generally include filter media positioned within a filter housing which may be attachable to a first fitting or a second fitting of a water storage reservoir to provide filtered water to a reservoir outlet. The filter housing includes an adapter sleeve that defines mounting features that correspond with the first fitting and the second fitting to enable the water filter assembly to connect to either of the first fitting or the second fitting. In this manner, a single water filter assembly may be used in beverage dispensers having different reservoir fittings. In addition, the number of parts of the water filter assembly may be reduced, assembly may be simplified, potential for leaks may be reduced, and filter performance may be improved.

In one exemplary embodiment, a water filter assembly for a beverage dispenser is provided. The beverage dispenser has a reservoir and the water filter assembly defines an axial direction and a radial direction. The water filter assembly includes a filter medium extending along the axial direction and defining an interior filtered water chamber, the filter medium configured to filter water flowing inward generally along the radial direction into the interior filtered water chamber. The water filter assembly further includes a housing extending along the axial direction between a first end and a second end and enclosing the filter medium. The housing and the filter medium define an unfiltered water chamber between the housing and the filter medium. The housing additionally defines an inlet in flow communication with the unfiltered water chamber proximate to the second end for receipt of unfiltered water from the reservoir and a housing outlet in flow communication with the interior filtered water chamber of the filter medium. The housing is configured to provide filtered water to a reservoir outlet. The water filter assembly further includes a universal adapter sleeve disposed at the second end of the housing and defining an inner surface defining a first set of mounting features configured to receive a first fitting and a second set of mounting features configured to receive a second fitting.

In another exemplary embodiment, a beverage dispenser is provided. The beverage dispenser includes a dispenser; a hot water chamber for providing the dispenser with heated water; a reservoir; and a water filter assembly. The reservoir defines a reservoir outlet and includes a first fitting defining a plurality of ridges that protrude outwardly along the radial direction or a second fitting defining a partial fitting flange protruding outwardly along the radial direction. The first fitting or the second fitting are attached to the reservoir and at least partially surround the reservoir outlet, which is fluidly connected to the hot water chamber for providing water to the hot water chamber. The water filter assembly defines an axial direction and a radial direction and includes a filter medium, a housing, and a universal adapter sleeve. The filter medium extends along the axial direction and defines an interior filtered water chamber, the filter medium configured to filter water flowing inward generally along the radial direction into the interior filtered water chamber. The housing extends along the axial direction between a first end and a second end and encloses the filter medium. The housing and the filter medium define an unfiltered water chamber between the housing and the filter medium. The housing additionally defines an inlet in flow communication with the unfiltered water chamber proximate to the second end for receipt of unfiltered water from the reservoir. The housing further defines a housing outlet in flow communication with the interior filtered water chamber of the filter medium, the housing configured to provide filtered water to the reservoir outlet. The universal adapter sleeve is disposed at the second end of the housing and defines an inner surface defining a plurality of axially extending slots configured to receive the plurality of ridges of the first fitting when the adapter sleeve is properly aligned, thereby allowing the adapter sleeve to move in the axial direction toward the first fitting. The inner surface further defines a partial adapter flange extending inwardly along the radial direction and being configured to engage the partial fitting flange to prevent relative axial movement between the adapter sleeve and the second fitting.

These and other features, aspects, and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 1 provides a front, perspective view of a beverage dispenser according to an exemplary embodiment of the present subject matter.

FIG. 2 provides a schematic diagram of a portion of the exemplary beverage dispenser of FIG. 1.

FIG. 3 provides a perspective view of a water filter assembly in accordance with an exemplary embodiment of the present disclosure.

FIG. 4 provides a cross-sectional view of the exemplary water filter assembly of FIG. 3.

FIG. 5 provides a front, perspective view of an adapter sleeve of the exemplary water filter assembly of FIG. 3.

FIG. 6 provides a bottom, perspective view of the exemplary adapter sleeve of FIG. 5.

FIG. 7 provides a perspective cross-sectional view of the exemplary adapter sleeve of FIG. 5, with the filter media and second filter cap removed for clarity.

FIG. 8 provides a cross-sectional view of the exemplary adapter sleeve of FIG. 5 coupled to a first fitting according to an exemplary embodiment of the present subject matter.

FIG. 9 provides a close-up, cross-sectional view of the exemplary adapter sleeve of FIG. 5 coupled to the first fitting according to an exemplary embodiment of the present subject matter, with the second filter cap removed for clarity.

FIG. 10 provides a bottom, perspective view of the first fitting being engaged with the exemplary adapter sleeve of FIG. 5.

FIG. 11 provides a bottom view of the first fitting being engaged with the exemplary adapter sleeve of FIG. 5.

FIG. 12 provides a cross-sectional view of the exemplary adapter sleeve of FIG. 5 coupled to a second fitting according to an exemplary embodiment of the present subject matter.

FIG. 13 provides another cross-sectional view of the exemplary adapter sleeve of FIG. 5 coupled to the second fitting according to an exemplary embodiment of the present subject matter, with the filter media and second filter cap removed for clarity.

FIG. 14 provides a bottom view of the second fitting being engaged with the exemplary adapter sleeve of FIG. 5.

FIG. 15 provides a cross-sectional view of the second fitting being engaged with the exemplary adapter sleeve of FIG. 5 taken along Line X-X of FIG. 12.

FIG. 16 provides another cross-sectional view of the second fitting being engaged with the exemplary adapter sleeve of FIG. 5 taken along Line X-X of FIG. 12.

FIG. 17A provides another cross-sectional view of the second fitting being engaged with the exemplary adapter sleeve of FIG. 5 taken along Line X-X of FIG. 12, where the adapter sleeve is in an unlocked position.

FIG. 17B provides another cross-sectional view of the second fitting being engaged with the exemplary adapter sleeve of FIG. 5 taken along Line X-X of FIG. 12, where the adapter sleeve is in a locked position.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a front, perspective view of a beverage dispenser 100 according to an exemplary embodiment of the present subject matter. Beverage dispenser 100 is generally referred to as a "single serve beverage dispenser 100" and receives capsules or pods with flavorings therein that are brewed or mixed with hot or cold water to provide a hot or cold beverage, as desired. As an example, beverage dispenser 100 may be a KEURIG® brand single-cup coffee brewing system or a VERISMO™ brand single-cup coffee brewing system. However, beverage dispenser 100 may alternatively be any other suitable beverage dispenser.

As may be seen in FIG. 1, beverage dispenser 100 includes a body 102, a dispenser portion 104, a pan or tray 106, and a reservoir 108. A lever 110 is provided with dispenser portion 104 to allow a user to open a lid 112 of dispenser portion 104 and access a receptacle (not shown)

for receiving a capsule or pod. During brewing or mixing operations, water may be taken from the reservoir 108, heated or cooled, and provided to dispenser portion 104, wherein dispenser portion 104 either brews or mixes the water with the contents of the capsule or pod to provide a desired beverage. The beverage may be dispensed into a cup or mug (not shown) placed on tray 106 by a user. The exemplary beverage dispenser 100 also includes a control panel 114 including a display 116 and a plurality of user inputs 118 allowing the user to control operation of beverage dispenser 100.

It should be appreciated, however, that the present disclosure is not limited to any specific beverage dispenser 100, and in other exemplary embodiments, beverage dispenser 100 may have any other suitable configuration. Indeed, the water filter assembly described below may be used in any appliance where fluid from a supply source must be filtered prior to use.

As will be explained in greater detail below, and as is depicted in phantom in FIG. 1, a water filter assembly 120 is positioned in reservoir 108 and attached to a fitting 122 of reservoir 108. Water filter assembly 120 is generally provided to remove contaminants and particles in the water in reservoir 108 through, e.g., mechanical filtration and/or absorption of such contaminants.

Referring now to FIG. 2, a schematic diagram is provided of a portion of the exemplary beverage dispenser 100 of FIG. 1. As is depicted, beverage dispenser 100 further includes a hot water chamber 124 and a pump 128. Hot water chamber 124 is configured to provide dispenser portion 104 with heated water via a conduit 126. Additionally, pump 128 is in flow communication with reservoir 108 and is configured to provide a flow of water from the reservoir 108 to the hot water chamber 124 when activated. Pump 128 may be a centrifugal pump, or alternatively may be any other suitable pump.

A priming vent 130 is provided in flow communication with the pump 128 and the reservoir 108 for providing a flow of water from the pump 128 to the reservoir 108 during a priming operation of the pump 128. More particularly, priming vent 130 is provided to allow a pump head (not shown) of the pump 128 to flood with water during priming operations.

Moreover, as schematically depicted, water filter assembly 120 is positioned in reservoir 108 and attached to fitting 122 in reservoir 108. More particularly, reservoir 108 defines an outlet 132 fluidly connected to hot water chamber 124 via pump 128 for providing water to the hot water chamber 124. During operation of the beverage dispenser 100, pump 128 may pull water from reservoir 108, through water filter assembly 120, and provide such water to the hot water chamber 124. Water from the hot water chamber 124 may then be provided to dispenser portion 104, wherein such water may be brewed or mixed with contents of any capsules or pods positioned therein. As previously discussed, the desired beverage may then be dispensed via dispenser portion 104 to a user.

During operation, if a pressure drop across water filter assembly 120 is greater than a certain threshold, fluid may be pulled from priming vent 130 as opposed to reservoir 108. The fluid may initially be water, however, it may also include air. If such fluid is allowed to be so pulled from priming vent 130 to pump 128 such that air is provided to pump 128, the air may cause pump 128 to cavitate and not operate properly. Accordingly, in certain exemplary embodiments of the present disclosure, beverage dispenser 100 may further include a one-way valve 133 positioned in priming vent 130 for preventing a flow of fluid in a flow direction away from reservoir 108 through priming vent towards pump 128. One-way valve 133 may have any suitable configuration. Inclusion of one-way valve 133 may allow for proper operation of beverage dispenser 100, or more particularly proper operation of pump 128, regardless of a pressure drop across water filter assembly 120 greater than a certain threshold.

Referring now to FIGS. 3 and 4, water filter assembly 120 is illustrated in accordance with an exemplary embodiment of the present disclosure. More particularly, FIG. 3 provides a perspective view of water filter assembly 120 in accordance with an exemplary embodiment of the present disclosure, and FIG. 4 provides a cross-sectional view of the exemplary water filter assembly 120 of FIG. 3. As best shown in FIG. 4, water filter assembly 120 defines an axial direction A and a radial direction R. In certain embodiments, the axial direction A of water filter assembly 120 may be aligned with a vertical direction, however in other embodiments, water filter assembly 120 may be aligned in any other suitable orientation.

Water filter assembly 120 includes a filter medium 134 extending along the axial direction A between a first end 136 and a second end 138—filter medium 134 defining interior filtered water chamber 140. For the embodiment depicted, filter medium 134 is a cylindrical filter medium configured to filter water flowing inward generally along the radial direction R. Filter medium may be an activated carbon block, a pleated polymer sheet, a spun cord material, a melt blown material, one or more layers of fine mesh, or any other material suitable for filtering contaminants from a flow of fluid. According to the illustrated embodiment, filter medium 134 is, for example, an activated carbon block shaped in the form of a hollow cylinder. However, in other embodiments, filter medium 134 may be formed of any other suitable material.

Filter medium 134 is enclosed by a housing 142 also extending along the axial direction A between a first end 144 and a second end 146. More particularly, filter medium 134 is enclosed by a body portion 148 of housing 142 defining a generally cylindrical shape extending along the axial direction A. First end 144 of housing 142 is positioned proximate to first end 136 of filter medium 134 and second end 146 of housing 142 is positioned proximate to second end 138 of filter medium 134. Housing 142 and filter medium 134 together define an unfiltered water chamber 150 between the housing 142 and filter medium 134. For the embodiment depicted, the unfiltered water chamber 150 includes a generally annular chamber between body portion 148 and filter medium 134, as well as a volume above filter medium 134 at first end 144 of housing 142 and first end 136 of filter medium 134.

Body portion 148 of housing 142 additionally defines one or more inlets 154 proximate to second end 146 of housing 142 for receipt of unfiltered water from, e.g., reservoir 108. More particularly, housing 142 defines a channel 152, with the inlets 154 defined at an end of the channel 152 proximate to second end 146 of housing 142. Inlets 154 may provide flow communication between reservoir 108 and unfiltered water chamber 150. In this manner, unfiltered water may flow into housing 142 from reservoir 108 through inlets 154 and may fill the entire unfiltered water chamber 150.

In alternative embodiments, housing 142 may further include a siphon tube that extends from a location proximate to second end 146 of housing 142 to a location proximate first end 144 of housing 142 to provide unfiltered water to the unfiltered water chamber 150 at a location proximate to first end 144 of housing 142. Such a configuration may allow for a relatively high-performance filtering of water in reservoir 108 while minimizing a pressure drop across water filter assembly 120. More particularly, with such a configuration, unfiltered water is provided to first end 136 of filter medium 134 and may saturate substantially all of a surface area of filter medium 134 by filling unfiltered water chamber 150 from a top end.

Although the above-described embodiments describe inlets 154 positioned proximate second end 146, one skilled in the art will appreciate that other configurations may use any number of inlets positioned anywhere on housing 142. Indeed, inlets may be configured in any manner suitable for filling unfiltered water chamber 150 with fluid.

Referring specifically to FIG. 4, a first filter cap 158 is positioned over first end 136 of filter medium 134 to cover interior filtered water chamber 140 of filter medium 134. First filter cap 158 may be attached to first end 136 of filter medium 134 in any suitable manner. For example, first filter cap 158 may be attached to first end 136 of filter medium 134 using a glue or other suitable epoxy. Notably, first filter cap 158 may seal interior filtered water chamber 140 from unfiltered water chamber 150 at first end 136 of filter medium 134. Accordingly, unfiltered water provided to unfiltered water chamber 150 must flow inwardly along the radial direction R through filter medium 134 to reach interior filtered water chamber 140.

Housing 142 further includes a housing cap 160 positioned at first end 144 of housing 142 covering body portion 148 of housing 142. In certain embodiments, housing cap 160 may be attached to body portion 148 of water filter assembly 120 using an interference fit and/or a spin welding attachment method. However, in other embodiments, housing cap 160 may be attached to body portion 148 using any other suitable attachment means or mechanism to form a hermetic seal. Alternatively, in still other embodiments one or more portions of housing cap 160 may be formed integrally with body portion 148.

Water filter assembly 120 further includes a second filter cap 162 positioned at second end 138 of filter medium 134. Second filter cap 162 is configured for sealing second end 138 of filter medium 134 to housing 142. More particularly, second filter cap 162 includes a flange 164 extending outwardly along the radial direction R. Similarly, second end 146 of housing 142 includes a corresponding flange 166 extending inwardly along the radial direction R. Flange 164 of second filter cap 162 is positioned between the second end 146 of filter medium 134 and flange 166 of second end 138 of housing 142.

In certain embodiments, flange 164 of second filter cap 162 may be attached to second end 138 of filter medium 134 and/or flange 166 of second end 146 of housing 142 using a glue or any other suitable epoxy. Additionally, or alternatively, flange 164 of second filter cap 162 may be attached to second end 138 of filter medium 134 and/or flange 166 of second end 146 of housing 142 by applying a grease. Moreover, it should be appreciated, that in still other embodiments, flange 164 of second filter cap 162 may be attached to second end 138 of filter medium 134 and/or flange 166 of second end 146 of housing 142 in any other suitable manner, or alternatively may not be attached and instead one or more of the various components may be sealed by designing water filter assembly 120 with relatively close tolerances.

Referring now particularly to FIG. 4, housing cap 160 may include one or more one-way valves to control the flow of fluids between reservoir 108, unfiltered water chamber 150, and interior filtered water chamber 140. During certain events, air may make its way into one or both of interior filtered water chamber 140 and unfiltered water chamber 150. For example, air may be present in one or both of interior filtered water chamber 140 and unfiltered water chamber 150 when water filter assembly 120 is first installed in reservoir 108 or when the water level in reservoir 108 decreases. However, to ensure proper operation of beverage dispenser 100, it is generally beneficial for interior filtered water chamber 140 and unfiltered water chamber 150 to be completely filled with water.

Accordingly, first filter cap 158 may include a one-way valve 180 allowing air and fluid from interior filtered water chamber 140 to flow into unfiltered water chamber 150. For the embodiment depicted, one-way valve 180 is configured as a ball check valve. More specifically, one-way valve 180 includes an inverse frustoconical opening with a bottom hole defined adjacent to interior filtered water chamber 140 and a top hole positioned adjacent to unfiltered water chamber 150. A ball 182 is positioned in one-way valve 180 and is configured to cover the bottom hole to prevent fluid from traveling from unfiltered water chamber 150 to interior filtered water chamber 140. Additionally, ball 182 is configured to move upwards in response to a pressure differential greater than a predetermined amount across one-way valve 180—i.e., when a pressure in interior filtered water chamber 140 is more than a predetermined amount greater than a pressure in unfiltered water chamber 150—such that fluid may flow around ball 182 and into unfiltered water chamber 150.

Notably, ball 182 is not biased towards resting against the bottom hole (i.e., a closed position) other than by any force on ball 182 exerted by gravity. The predetermined amount of pressure differential for ball 182 to move up in certain exemplary embodiments may accordingly be relatively low. For example, in certain embodiments, ball 182 may be configured to move upwards when the pressure differential is less than or equal to one inch of water pressure. Additionally, for the embodiment depicted, ball 182 may be formed of a non-buoyant elastomeric material. However, in other exemplary embodiments, ball 182 may be formed of any other suitable material and the pressure differential may be any other suitable pressure differential.

In general, one-way valve 180 assists in evacuating air trapped in filtered water chamber 140, e.g., when it is first installed in reservoir 108. One-way valve 180 may be particularly beneficial when air becomes trapped inside interior filtered water chamber 140 after the filter medium 134 is wetted, e.g., when water filter assembly 120 is installed, removed, and reinserted into reservoir 108, or after the reservoir 108 is emptied. When this occurs, air trapped inside interior filtered water chamber 140 may not evacuate completely because a wet filter medium 134 provides more flow resistance than a dry filter medium 134.

As is also depicted in FIG. 4 housing cap 160 may similarly include a one-way valve 184 (details not shown) that is configured in substantially the same manner as one-way valve 180 in first filter cap 158. In this manner, one-way valve 184 allows air and fluid to travel from unfiltered water chamber 150 to reservoir 108, but prevents air or water from entering unfiltered water chamber 150 from reservoir 108 through housing cap 160. Therefore, as water filter assembly 120 is submerged, water may fill the entire unfiltered water chamber 150 and interior filtered water chamber 140, thereby displacing all air within housing 160, which may be evacuated through one-way valve 184. Then, one-way valve 184 acts as a seal to provide suction and prevent housing 160 from draining as the water level in reservoir 108 is lowered. Therefore, the water level may drop all the way to inlet 154 positioned near the bottom of reservoir 108, but the water filter assembly 120 remains substantially filled with water.

By filling the entire unfiltered water chamber 150 with water, substantially all of the surface area of filter medium 134 may be utilized, and a pressure drop across water filter assembly 120 may remain within an acceptable limit of beverage dispenser 100. Moreover, such a configuration provides for utilization of substantially all of the surface area of filter medium 134 regardless of a water level in reservoir 108. Accordingly, substantially all of the surface area of filter medium 134 may be utilized even when a water level in reservoir 108 is below first end 144 of housing 142 and first end 136 of filter medium 134. It should be appreciated, that as used herein, terms of approximation, such as "substantially" and "approximately," refer to being within a ten percent margin of error.

Although the one-way valves 180, 184 described above are ball check valves, one skilled in the art will appreciated that many other types and configurations of one-way valves are possible and within the scope of the present subject matter. For example, in alternative embodiments, one or more of one-way valve 184 in housing cap 160 and one-way valve 180 in first filter cap 158 may be configured as an umbrella type one-way valve, a duckbill type one-way valve, or any other suitable one-way valve.

Referring now generally to FIGS. 5 through 17, mounting features that enable water filter assembly 120 to be installed in beverage dispensers 100 having different reservoir fittings will now be described. A first fitting 200 (as shown in FIGS. 8 through 11) and a second fitting 202 (as shown in FIGS. 12 through 17) will be described below for the purpose of explaining such mounting features. First fitting 200 is typically used in Keurig® 1.0 coffee makers and second fitting 202 is typically used in Keurig® 2.0 coffee makers. Fittings 200, 202 may be attached to reservoir 108 over outlet 132 using, e.g., one or more screws (not shown). Therefore, the mounting features described herein may be used to mount water filter assembly 120 to reservoir 108 of either a Keurig® 1.0 or Keurig® 2.0 machine.

As will be described in detail below, housing 142 may include an adapter sleeve 204 that has an inner surface 206 that defines two sets of mounting features which enable water filter assembly 120 to be attached to two different reservoir fittings—i.e., first fitting 200 and second fitting 202. More particularly, adapter sleeve 204 defines a first set of mounting features 208 (shown generally in FIG. 6) configured to receive first fitting 200 to attach water filter assembly 120 to reservoir 108. In addition, adapter sleeve 204 defines a second set of mounting features 210 (shown generally in FIG. 6) configured to receive second fitting 202 to attach water filter assembly 120 to reservoir 108.

Adapter sleeve 204 may be attached to housing 142 in any suitable manner. For example, in certain exemplary embodiments, adapter sleeve 204 may be attached to housing 142 using an ultrasonic welding process. However, in other exemplary embodiments, adapter sleeve 204 may instead be attached to housing 142 using, e.g., glue or other mechanical fastening means. Alternatively, as shown in the illustrated embodiment, adapter sleeve 204 may be formed integrally with housing 142, e.g., during an injection molding process. In this manner, water filter assembly 120 may have a reduced number of parts, installation may be simplified, and the risk of leaks may be minimized or eliminated.

As best shown in FIGS. 6, 10, and 11, first set of mounting features 208 may include a plurality of axially extending slots 212 defined by inner surface 206 of adapter sleeve 204 and a plurality of ridges 214 that protrude outwardly along the radial direction R from first fitting 200. As shown, first fitting 200 is generally circular in shape and includes ridges 214 circumferentially spaced about an outer surface of first fitting 200. Ridges 214 may also extend generally along the axial direction A. Adapter sleeve 204 may have features configured to interact with such ridges 214 to enable water filter assembly 120 to be attached to first fitting 200. More particularly, as is shown in FIG. 6, for example, adapter sleeve 204 may define axially extending slots 212 in inner surface 206 of adapter sleeve 204 configured to receive ridges 214 of first fitting 200.

First set of mounting features 208 generally prevent the installation of water filter assembly 120 unless housing 142 is rotated such that axially extending slots 212 are aligned with ridges 214. When rotated to the proper alignment angle, ridges 214 may engage axially extending slots 212, thereby allowing adapter sleeve 204 to move in the axial direction A toward first fitting 200. As adapter sleeve 204 slides into an installed position, first fitting 200 may form a seal with housing 142. For example, as will be described in detail below, first fitting 200 may form a seal with flange 164 on second filter cap 162 or with flange 166 on housing 142. In addition, or alternatively, first fitting 200 may use one or more seals to create a fluid-tight seal between first fitting 200 and housing 142, thereby placing a fluid outlet 216 in second filter cap 162 in sealed fluid communication with reservoir outlet 132.

According to the exemplary embodiment illustrated in FIGS. 10 and 11, the plurality of axially extending slots 212 include a first set of symmetrically positioned slots 220 having a first shape and a second set of symmetrically positioned slots 222 having a second shape. More specifically, the first set of slots 220 may have a trapezoidal profile and may be circumferentially spaced around inner surface 206 of adapter sleeve 204 at 60, 120, 240, and 300 degrees. The second set of slots 222 may have a square profile and may be circumferentially spaced around inner surface 206 of adapter sleeve 204 at 0 and 180 degrees. Similarly, the plurality of ridges 214 may include a first set of ridges 224 and a second set of ridges 226 that correspond to first set of slots 220 and second set of slots 222, respectively. In this manner, the plurality of ridges 214 may only engage the plurality of axially extending slots 212 when adapter sleeve 204 is positioned at 0 degrees or 180 degrees. However, one skilled in the art will appreciate that the size, number, and position of the features may be adjusted as needed for a particular application.

Referring now specifically to FIG. 8, second filter cap 162 additionally defines a cylindrical sleeve 230 extending away from filter medium 134 along the axial direction A. More particularly, cylindrical sleeve 230 of second filter cap 162 extends along the axial direction A away from flange 164 of second filter cap 162. Second filter cap 162 may have an outer surface 232 defining an annular indentation 234 configured to receive a seal 236 that extends circumferentially around outer surface 232 to provide a seal between second filter cap 162 and first fitting 200, as described below. For the embodiment depicted, seal 236 is configured as an O-ring seal positioned in annular indentation 234 in outer surface 232 of second filter cap 162. However, in other exemplary embodiments, any other suitable seal may be provided to better effectuate a fluid tight seal between water filter assembly 120 and first fitting 200.

For the embodiment depicted, cylindrical sleeve 230 of second filter cap 162 is positioned inwardly along the radial direction R from adapter sleeve 204 of housing 142. Accordingly, cylindrical sleeve 230 of second filter cap 162 and adapter sleeve 204 of housing 142 together define a slot 240. For the embodiment depicted, slot 240 is configured for receipt of first fitting 200 surrounding outlet 132 of reservoir 108. More specifically, first fitting 200 includes a neck 242 received in slot 240 of water filter assembly 120. Neck 242 includes a seal 244 extending circumferentially around an outer surface 246 of neck 242. For the embodiment depicted, seal 244 is an O-ring seal positioned in an annular indentation 248 in outer surface 246 of neck 242. With such a configuration, seal 244 may form a fluid tight seal with water filter assembly 120, or more particularly, with inner surface 206 of adapter sleeve 204. Notably, seal 236 on outer surface 232 of second filter cap 162 and seal 244 on outer surface 246 of neck 242 both ensure that a proper seal is maintained between water filter assembly 120 and first fitting 200.

Referring now to FIGS. 8 and 9, adapter sleeve 204 may further define a protruding rib 250 that extends generally inwardly along the radial direction R from inner surface 206 and circumferentially around inner surface 206 of adapter sleeve 204. Inner surface 206 of adapter sleeve 204 may also define an indentation 252 above protruding rib 250. Neck 242 of first fitting 200 may define an upper lip 254 that may be configured to "snap" into indentation 252 to prevent further axial movement of the adapter sleeve 204 relative to first fitting 200. According to the illustrated embodiment (as best shown in FIG. 13), protruding rib 250 includes two or more ribs that extend only partially around the inner circumference of inner surface 206. However, according to an alternative embodiment, protruding rib 250 may extend around the entire internal circumference of inner surface 206. In this manner, housing 142 of water filter assembly 120 may be installed in reservoir 108 by aligning the first set of mounting features 208, and pushing down on housing 142 until adapter sleeve 204 snaps into a fixed position on first fitting 200. When water filter assembly 120 is attached to first fitting 200, a housing outlet 216 defined by second filter cap 162 is fluidly connected to an outlet 132 of reservoir 108 over which first fitting 200 is attached.

Referring now to FIGS. 12 through 17, the second set of mounting features 210 will be described. More particularly, FIGS. 12 and 13 provide cross-sectional views of a water filter assembly 120 and adapter sleeve 204 attached to second fitting 202 in the locked and unlocked position, respectively, in accordance with another exemplary embodiment present disclosure; FIG. 14 provides a bottom view of adapter sleeve 204 being installed on second fitting 202; and FIGS. 15 through 17 provides cross-sectional views of adapter sleeve 204 being installed on second fitting 202 as taken along Line X-X of FIG. 12.

Adapter sleeve 204 may generally include one or more features extending inwardly along the radial direction R configured to engage with one or more corresponding features on second fitting 202 for attaching water filter assembly 120 to second fitting 202 which surrounds outlet 132 of reservoir 108. As best shown in FIGS. 12 and 13, the second set of mounting features 210 may include a first partial flange 260 defined by inner surface 206 of adapter sleeve 204 and extending inwardly along the radial direction R, and a second partial flange 262 defined by second fitting 202 and protruding outwardly along the radial direction R.

In general, first partial flange 260 may be configured to engage second partial flange 262 to prevent relative axial movement between adapter sleeve 204 and second fitting 202, thereby locking water filter assembly 120 in the installed position. More particularly, according to the illustrated embodiment, first partial flange 260 may define one or more first gaps 264 and second partial flange 262 may define one or more second gaps 266. First gaps 264 may be configured to receive second partial flange 262 and second gaps 266 may be configured to receive first partial flange 260 when adapter sleeve 204 is properly aligned. In this manner, when adapter sleeve 204 is properly aligned with second fitting 202, adapter sleeve 204 may be moved axially toward second fitting 202 and may be rotated to engage first partial flange 260 with second partial flange 262 to prevent further relative axial movement between adapter sleeve 204 and second fitting 202.

According to the exemplary embodiment, and as best illustrated in FIGS. 15 and 17, first partial flange 260 may further define an axially extending stop 268 that is configured to prevent rotation of adapter sleeve 204 relative to second fitting 202 when adapter sleeve 204 has been rotated to the installed position. Axially extending stop 268 may be a ridge protruding from inner surface 206 of adapter sleeve 204. Axially extending stop 268 extends from inner surface 206 far enough to contact second partial flange 262 as it is rotated into the installed position. For example, axially extending stop 268 may extend inwardly along the radial direction R the same distance as first partial flange 260, while also extending axially from a top surface of first partial flange 260, thereby stopping further rotation of first partial flange 260 when it has been rotated to engage second partial flange 262.

According to the exemplary embodiment illustrated in FIGS. 12 and 13, an axial end 270 of adapter sleeve 204 may define a circumferential groove 272 configured to receive a seal 274. Seal 274 extends circumferentially around axial end 270 and is configured to contact and form a fluid tight seal with one or both of a bottom surface of reservoir 108 and second fitting 202 surrounding reservoir outlet 132 when adapter sleeve 204 is attached to second fitting 202. Seal 274 may a simple elongated O-ring (FIG. 12) or may be a seal that flares outwardly along the radial direction R (FIG. 13). Alternatively, seal 274 may be configured in any suitable manner to provide a seal between adapter sleeve 204 and reservoir 108 or second fitting 202. Such a configuration may therefore ensure water must pass through water filter assembly 120 prior to flowing through outlet 132 of reservoir 108.

A water filter assembly 120 having adapter sleeve 204 as described above in accordance with the exemplary embodiments of the present subject matter may be installed on either first fitting 200 or second fitting 202. In addition, water filter assembly 120 has fewer parts when compared to prior designs that require special adapters for each fitting. In addition, by integrally forming adapter sleeve, assembly and installation is simplified, and the likelihood of leaks is decreased or eliminated. Although adapter sleeve 204 is described as having a first set of mounting features 208 for engaging first fitting 200 and a second set of mounting features for engaging second fitting 202, one skilled in the art will appreciate that this configuration of adapter sleeve 204 is only exemplary. Indeed, adapter sleeve may be designed to attach to different fittings, and may be used to attach to more than two distinct fittings.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A water filter assembly for a beverage dispenser having a reservoir, the water filter assembly defining an axial direction and a radial direction and comprising:
   a filter medium extending along the axial direction and defining an interior filtered water chamber, the filter medium configured to filter water flowing inward generally along the radial direction into the interior filtered water chamber;
   a housing extending along the axial direction between a first end and a second end and enclosing the filter medium, the housing and the filter medium defining an unfiltered water chamber between the housing and the filter medium, the housing additionally defining an inlet in flow communication with the unfiltered water chamber proximate to the second end for receipt of unfiltered water from the reservoir, the housing further defining a housing outlet in flow communication with the interior filtered water chamber of the filter medium, the housing configured to provide filtered water to a reservoir outlet; and
   a universal adapter sleeve disposed at the second end of the housing and defining an inner surface defining a first set of mounting features configured to receive a first fitting and a second set of mounting features configured to receive a second fitting, wherein the first set of mounting features comprises a plurality of axially extending slots defined by the inner surface of the adapter sleeve.

2. The water filter assembly of claim 1, wherein the first set of mounting features comprises a plurality of ridges that protrude outwardly along the radial direction from the first fitting, the plurality of ridges configured to engage the plurality of axially extending slots when the adapter sleeve is properly aligned, thereby allowing the adapter sleeve to move in the axial direction toward the first fitting.

3. The water filter assembly of claim 2, wherein the adapter sleeve further defines a protruding rib that extends inwardly along the radial direction and the first fitting defines an upper lip, the upper lip being configured to snap into a recess defined above the protruding rib to prevent further axial movement of the adapter sleeve relative to the first fitting.

4. The water filter assembly of claim 3, wherein the first fitting has an outer surface defining an annular indentation configured to receive a seal that extends circumferentially around the outer surface to provide a seal between the adapter sleeve and the first fitting.

5. The water filter assembly of claim 2, wherein the housing further comprises a filter cap having an outer surface defining an annular indentation configured to receive a seal that extends circumferentially around the outer surface to provide a seal between the filter cap and an inner surface of the first fitting.

6. The water filter assembly of claim 2, wherein the plurality of axially extending slots comprise a first set of symmetrically positioned slots having a first shape and a second set of symmetrically positioned slots having a second shape, and the plurality of ridges comprise a first set ridges and a second set of ridges that correspond to the plurality of axially extending slots, such that the plurality of ridges may only engage the plurality of axially extending slots when the adapter sleeve is positioned at 0 degrees or 180 degrees.

7. The water filter assembly of claim 1, wherein the second set of mounting features comprises a first partial flange defined by an inner surface of the adapter sleeve and extending inwardly along the radial direction, and a second partial flange defined by the second fitting and protruding outwardly along the radial direction, the first partial flange being configured to engage the second partial flange to prevent relative axial movement between the adapter sleeve and the second fitting.

8. The water filter assembly of claim 7, wherein the first partial flange defines one or more first gaps and the second partial flange defines one or more second gaps, the first gaps being configured to receive the second partial flange and the second gaps being configured to receive the first partial flange, such that when properly aligned the adapter sleeve may be moved axially toward the second fitting and may be rotated to engage the first partial flange and the second partial flange to prevent further relative axial movement between the adapter sleeve and the second fitting.

9. The water filter assembly of claim 8, wherein the first partial flange defines an axially extending stop that is configured to prevent rotation of the adapter sleeve relative to the second fitting when the adapter sleeve has been rotated to the installed position where the first partial flange engages the second partial flange.

10. The water filter assembly of claim 7, wherein an axial end of the adapter sleeve defines a circumferential groove configured to receive a seal, the seal being configured to form a seal with one or both of the reservoir and the second fitting surrounding the reservoir outlet when the adapter sleeve is attached to the second fitting.

11. The water filter assembly of claim 1, wherein the adapter sleeve is injection molded with the housing, such that the housing and the adapter sleeve form one integral part.

12. A beverage dispenser comprising:
   a dispenser;
   a hot water chamber for providing the dispenser with heated water;
   a reservoir defining a reservoir outlet and including a first fitting defining a plurality of ridges that protrude outwardly along the radial direction or a second fitting defining a partial fitting flange protruding outwardly along the radial direction, the first fitting or the second fitting being attached to the reservoir and at least partially surrounding the reservoir outlet, the reservoir outlet being fluidly connected to the hot water chamber for providing water to the hot water chamber; and
   a water filter assembly defining an axial direction and a radial direction and comprising:
   a filter medium extending along the axial direction and defining an interior filtered water chamber, the filter medium configured to filter water flowing inward generally along the radial direction into the interior filtered water chamber;
   a housing extending along the axial direction between a first end and a second end and enclosing the filter medium, the housing and the filter medium defining an unfiltered water chamber between the housing and the filter medium, the housing additionally defining an inlet in flow communication with the unfiltered water chamber proximate to the second end for receipt of unfiltered water from the reservoir, the housing further defining a housing outlet in flow communication with the interior filtered water chamber of the filter medium, the housing configured to provide filtered water to the reservoir outlet; and a universal adapter sleeve disposed at the second end of the housing and defining an inner surface defining a plurality of axially extending slots configured to receive the plurality of ridges of the first fitting when the adapter sleeve is properly aligned, thereby allowing the adapter sleeve to move in the axial direction toward the first fitting, and the inner surface further defining a partial adapter flange extending inwardly along the radial direction and being configured to engage the partial fitting flange to prevent relative axial movement between the adapter sleeve and the second fitting.

13. The beverage dispenser of claim 12, wherein the adapter sleeve further defines a protruding rib that extends inwardly along the radial direction and the first fitting defines an upper lip, the upper lip being configured to snap into a recess defined above the protruding rib to prevent further axial movement of the adapter sleeve relative to the first fitting.

14. The beverage dispenser of claim 13, wherein the first fitting has an outer surface defining an annular indentation configured to receive a seal that extends circumferentially around the outer surface to provide a seal between the adapter sleeve and the first fitting.

15. The beverage dispenser of claim 12, wherein the housing further comprises a filter cap having an outer surface defining an annular indentation configured to receive a seal that extends circumferentially around the outer surface to provide a seal between the filter cap and an inner surface of the first fitting.

16. The beverage dispenser of claim 12, wherein the plurality of axially extending slots comprise a first set of symmetrically positioned slots having a first shape and a second set of symmetrically positioned slots having a second shape, and the plurality of ridges comprise a first set ridges and a second set of ridges that correspond to the plurality of axially extending slots, such that the plurality of ridges may only engage the plurality of axially extending slots when the adapter sleeve is positioned at 0 degrees or 180 degrees.

17. The beverage dispenser of claim 12, wherein the partial adapter flange defines one or more first gaps and the partial fitting flange defines one or more second gaps, the first gaps being configured to receive the partial fitting flange and the second gaps being configured to receive the partial adapter flange, such that when properly aligned the adapter sleeve may be moved axially toward the second fitting and may be rotated to engage the partial adapter flange and the partial fitting flange to prevent further relative axial movement between the adapter sleeve and the second fitting.

18. The beverage dispenser of claim 17, wherein the partial adapter flange defines an axially extending stop that is configured to prevent rotation of the adapter sleeve relative to the second fitting when the adapter sleeve has been rotated to the installed position where the partial adapter flange engages the partial fitting flange.

19. The beverage dispenser of claim 12, wherein an axial end of the adapter sleeve defines a circumferential groove configured to receive a seal, the seal being configured to form a seal with one or both of the reservoir and the second fitting surrounding the reservoir outlet when the adapter sleeve is attached to the second fitting.

20. The beverage dispenser of claim 12, wherein the adapter sleeve is injection molded with the housing, such that the housing and the adapter sleeve form one integral part.

* * * * *